No. 657,291. Patented Sept. 4, 1900.
W. H. LARIMER.
ANIMAL TRAP.
(Application filed May 17, 1899.)
(No Model.)

Witnesses
S. S. Williamson
James Blacklum

Inventor
William H. Larimer
By
G. W. C. Hayden
Atty.

THE NORRIS PETERS CO., PHOTO-LITHO., WASHINGTON, D. C.

UNITED STATES PATENT OFFICE.

WILLIAM H. LARIMER, OF TERRE HAUTE, INDIANA.

ANIMAL-TRAP.

SPECIFICATION forming part of Letters Patent No. 657,291, dated September 4, 1900.

Application filed May 17, 1899. Serial No. 717,142. (No model.)

*To all whom it may concern:*

Be it known that I, WILLIAM H. LARIMER, a citizen of the United States, residing at Terre Haute, in the county of Vigo and State of Indiana, have invented a certain new and useful Improvement in Animal-Traps, of which the following is a specification.

My invention relates to a new and useful improvement in animal-traps, and has for its object to provide a simple and effective trap of this description which will be specially adapted for catching alligators, wild game, and the like by precipitating the same into a pit formed in the ground, over which the trap is set.

With this end in view the invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1:
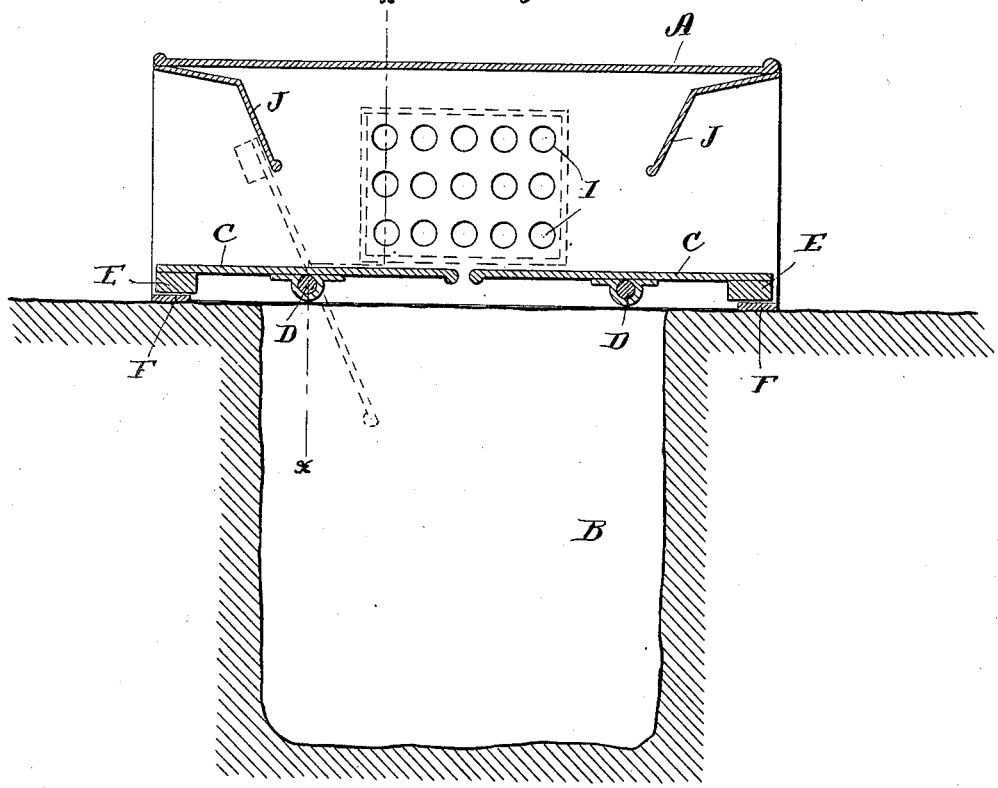
Figure 2:
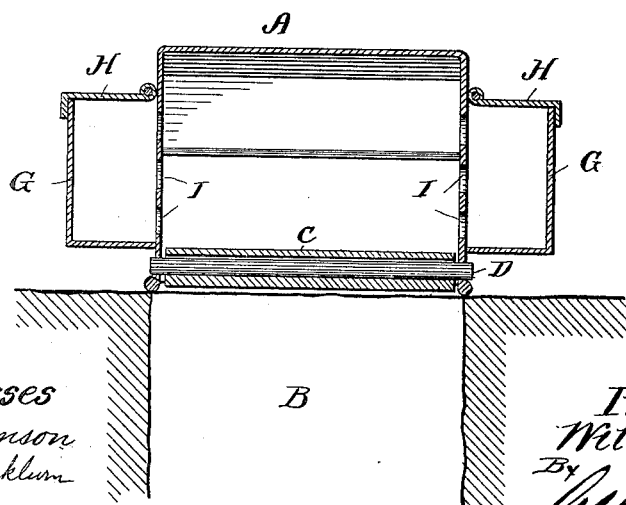

Figure 1 is a longitudinal section of a trap made in accordance with my improvement, the same being shown in position over a suitable pit; and Fig. 2, a cross-section thereof.

In carrying out my invention as here embodied A represents the body of the trap, which is preferably rectangular, having two sides and a top, the bottom and ends being left open. This body should be of such size as to readily span the pit B and permit the animal of the size desired to be caught to pass therein. Two platforms C are hinged in the bottom of the body upon the rods D, their outer ends being weighted, as indicated at E, and supported in their normal position by the cross-strips F.

Bait-boxes G are located upon the sides of the trap and are provided with the hinged covers H, by which means access will be gained thereto to supply the desired bait and then closed, so as to prevent this bait from being removed. A series of perforations I are formed in each side of the trap, so as to form a communication between the bait-boxes and the interior of the body, which will permit the odor from the bait to freely pass to the interior of the body and from thence out of the ends of the trap, thereby attracting the attention of the animal which it is desired to catch.

A shield J is located at each end of the trap and projects downward, so as to form stops for the platforms when they are swung to the position shown in dotted lines in Fig. 1, and a further object of these shields is to direct the course of the animal entering the trap, so as to compel it to walk directly onto the platforms and in a crouching position, from which it will be difficult for it to recover when the platforms are sprung. This is an important feature in my improvement, since it has been demonstrated by practice that an animal given free access to a large entrance will be able to thrust its mouth forward far enough to discover the character of the bait and remove the bait, if possible, and, if not, discover that it cannot be removed without being caught.

When the trap is properly located over a suitable pit, the animal may enter from either end thereof and will be induced to so enter by the odor from the bait, and when passing onto either of the platforms beyond the pivot-rods D will cause the platforms to swing, as shown in dotted lines in Fig. 1, which will precipitate the animal into the pit, and as soon as this has taken place the platforms will by the weights E be returned to their normally-horizontal position, and thus reset the trap for the taking of other animals. This process may go on indefinitely so long as the pit is capable of holding the animals precipitated therein. The reclosing of the platforms presents the further advantage of forming a cover to the pit, and thereby prevents the escape of the animal when once caught.

The cost of constructing a trap in accordance with my improvement is comparatively small, since it may be made entirely of sheet metal and may only be of a size sufficient to permit the animal to enter, since no retaining-receptacle is required, the pit formed in the ground serving that purpose. Thus the pit may be made of any desired depth without increasing the size of the trap.

Having thus fully described my invention, what I claim as new and useful is—

An animal-trap consisting of a rectangular body comprising top and side sections, the said side sections being perforated, bait-boxes secured on the outer surfaces of the sides inclosing said perforations, cross-strips at the lower corners, transversely of the body, the ends and bottom of said body being open, shields extending inwardly on an incline from the ends and having depending extremities, whereby the movement of the doors is limited and the animal is prevented from retreating, platforms hinged on transverse rods, and weights on the outer ends of the platforms.

In testimony whereof I have hereunto affixed my signature in the presence of two subscribing witnesses.

WILLIAM H. LARIMER.

Witnesses:
NILLIS D. THOMPSON,
ELLA A. TROYDON.